US009547799B2

(12) United States Patent
Chen et al.

(10) Patent No.: US 9,547,799 B2
(45) Date of Patent: Jan. 17, 2017

(54) METHODS AND SYSTEMS FOR CONTENT-BOUNDARY DETECTION

(75) Inventors: Lawrence Shao-hsien Chen, Vancouver, WA (US); John E. Dolan, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1687 days.

(21) Appl. No.: 12/175,386

(22) Filed: Jul. 17, 2008

(65) Prior Publication Data

US 2010/0014774 A1 Jan. 21, 2010

(51) Int. Cl.
 *G06K 9/00* (2006.01)
 *G06K 9/32* (2006.01)
(52) U.S. Cl.
 CPC ........... *G06K 9/3208* (2013.01); *G06K 9/3275* (2013.01)
(58) Field of Classification Search
 None
 See application file for complete search history.

(56) References Cited

U.S. PATENT DOCUMENTS

| 5,335,290 | A |  | 8/1994 | Cullen et al. |
|---|---|---|---|---|
| 5,452,374 | A |  | 9/1995 | Cullen et al. |
| 5,465,304 | A |  | 11/1995 | Cullen et al. |
| 5,528,387 | A |  | 6/1996 | Kelly et al. |
| 5,781,665 | A |  | 7/1998 | Cullen et al. |
| 5,825,914 | A | * | 10/1998 | Tsuboi ................ G06T 7/606 348/95 |
| 5,828,776 | A |  | 10/1998 | Lee et al. |
| 5,854,854 | A |  | 12/1998 | Cullen et al. |
| 5,880,858 | A |  | 3/1999 | Jin |
| 5,892,854 | A |  | 4/1999 | de Queiroz et al. |
| 5,901,253 | A |  | 5/1999 | Tretter |
| 5,974,199 | A |  | 10/1999 | Lee et al. |
| 5,978,519 | A |  | 11/1999 | Bollman et al. |
| 6,011,635 | A |  | 1/2000 | Bungo et al. |
| 6,043,823 | A |  | 3/2000 | Kodaira et al. |
| 6,178,270 | B1 | * | 1/2001 | Taylor ................. G06K 9/2054 358/453 |

(Continued)

FOREIGN PATENT DOCUMENTS

| JP | 2006-163821 A | 6/2006 |
|---|---|---|
| JP | 2008-305099 A | 12/2008 |

OTHER PUBLICATIONS

USPTO Office Action—U.S. Appl. No. 12/639,895—Notification Date Jan. 6, 2011.

(Continued)

*Primary Examiner* — Vikkram Bali
*Assistant Examiner* — Xuemei Chen
(74) *Attorney, Agent, or Firm* — Alleman Hall McCoy Russell & Tuttle LLP (57) ABSTRACT

Aspects of the present invention are related to systems and methods for automatically determining the content boundaries in a digital image. A gradient field may be generated using an edge detector, and the gradient field may be thresholded, by magnitude, to retain strong edges. The resulting localized edge positions may be projected onto a first direction and a second direction to form two projection histograms. The projection histograms may be analyzed to determine the boundaries of the image content. Corners of a cropping rectangle may be computed, and the digital image may be cropped according to the content boundaries.

26 Claims, 5 Drawing Sheets

(56) References Cited

U.S. PATENT DOCUMENTS

| | | | |
|---|---|---|---|
| 6,201,901 B1 * | 3/2001 | Zhou et al. | 382/306 |
| 6,282,326 B1 | 8/2001 | Lee et al. | |
| 6,298,157 B1 | 10/2001 | Wilensky | |
| 6,310,984 B2 | 10/2001 | Sansom-Wai et al. | |
| 6,360,026 B1 | 3/2002 | Kulkarni et al. | |
| 6,373,590 B1 | 4/2002 | Ancin et al. | |
| 6,430,320 B1 | 8/2002 | Jia et al. | |
| 6,556,721 B1 | 4/2003 | Wang et al. | |
| 6,560,376 B2 | 5/2003 | Kimbell et al. | |
| 6,674,919 B1 | 1/2004 | Ma et al. | |
| 6,901,168 B1 * | 5/2005 | Gardes et al. | 382/203 |
| 6,956,587 B1 | 10/2005 | Anson | |
| 6,973,222 B2 | 12/2005 | Haeberli | |
| 6,987,880 B2 | 1/2006 | Dolan et al. | |
| 7,034,848 B2 | 4/2006 | Sobol | |
| 7,065,261 B1 * | 6/2006 | Horie | G06K 9/3283 348/E5.055 |
| 7,068,855 B2 | 6/2006 | Simske et al. | |
| 7,133,050 B2 | 11/2006 | Schowtka | |
| 7,133,571 B2 | 11/2006 | Cheatle | |
| 7,201,323 B2 * | 4/2007 | Kotovich | G06Q 20/042 235/487 |
| 7,209,149 B2 | 4/2007 | Jogo | |
| 7,239,726 B2 * | 7/2007 | Li | G06K 9/00597 382/117 |
| 7,305,146 B2 | 12/2007 | Cheatle | |
| 7,657,091 B2 * | 2/2010 | Postnikov | G06K 9/00154 382/137 |
| 7,720,291 B2 * | 5/2010 | Trifonov | G06K 9/6234 382/159 |
| 2001/0005867 A1 * | 6/2001 | Zhou et al. | 710/100 |
| 2001/0007116 A1 * | 7/2001 | Zhou et al. | 710/100 |
| 2005/0168775 A1 | 8/2005 | Liu | |
| 2005/0244079 A1 | 11/2005 | Lin et al. | |
| 2006/0072847 A1 | 4/2006 | Chor et al. | |
| 2006/0098844 A1 | 5/2006 | Luo | |
| 2006/0109282 A1 | 5/2006 | Lin et al. | |
| 2006/0188173 A1 | 8/2006 | Zhang et al. | |
| 2006/0228044 A1 | 10/2006 | Yeh et al. | |
| 2006/0280364 A1 | 12/2006 | Ma et al. | |
| 2007/0013974 A1 | 1/2007 | Hattori | |
| 2007/0076979 A1 | 4/2007 | Zhang et al. | |
| 2009/0180694 A1 * | 7/2009 | Chen | 382/185 |
| 2011/0142341 A1 * | 6/2011 | Dolan et al. | 382/170 |

OTHER PUBLICATIONS

USPTO Office Action—U.S. Appl. No. 12/639,895—Notification Date Aug. 11, 2011.
Japanese Office Action—Patent Application No. 2010-263891—Mailing Date Feb. 14, 2012.

* cited by examiner

METHODS AND SYSTEMS FOR CONTENT-BOUNDARY DETECTION

FIELD OF THE INVENTION

Embodiments of the present invention comprise methods and systems for automatically determining image-content boundaries.

BACKGROUND

It may be desirable to crop off extraneous portions of a digital page, also considered a digital image, digital document and image. In particular, in may be desirable to retain the content of the digital page while eliminating extraneous page margins. Exemplary applications in which this may be useful include applications in which the page content may be repositioned on a different size page than the original, applications in which the page content may be composited with additional material and other document layout applications. It may be desirable to perform cropping automatically without user interaction. It also may be desirable to perform cropping on a digital page comprising an arbitrarily shaped content region, and it may be desirable to perform cropping when the digital page content is skewed with respect to the orthogonal image axes. Methods and systems for automatically determining image-content boundaries, therefore, may be desirable.

SUMMARY

Some embodiments of the present invention comprise methods and systems for determining content boundaries in a digital image. In some embodiments of the present invention, an edge detector based on local gradient computation may be used to generate a gradient field which may be thresholded by magnitude to retain strong edges. The resulting localized edge positions may be projected onto a first direction and a second direction, which may be normal to the first direction, to form two projection histograms. In some embodiments of the present invention, the first direction may be related to a skew vector which describes the skew of the image content relative to the image axes. The projection histograms may be analyzed to determine the boundaries of the image content. In some embodiments of the present invention, the corners of a cropping rectangle may be computed, wherein the cropping rectangle may contain the desired content from the image. In some embodiments of the present invention, the digital image may be cropped according to the content boundaries. In some embodiments of the present invention, the digital image may be simultaneously cropped and corrected for skew.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

It may be desirable to crop off extraneous portions of a digital page, also considered a digital image, digital document and image. In particular, in may be desirable to retain the content of the digital page while eliminating extraneous page margins. Exemplary applications in which this may be useful include applications in which the page content may be repositioned on a different size page than the original, applications in which the page content may be composited with additional material and other document layout applications. It may be desirable to perform cropping automatically without user interaction. It also may be desirable to perform cropping on a digital page comprising an arbitrarily shaped content region, and it may be desirable to perform cropping when the digital page content is skewed with respect to the orthogonal image axes.

Figure 1:
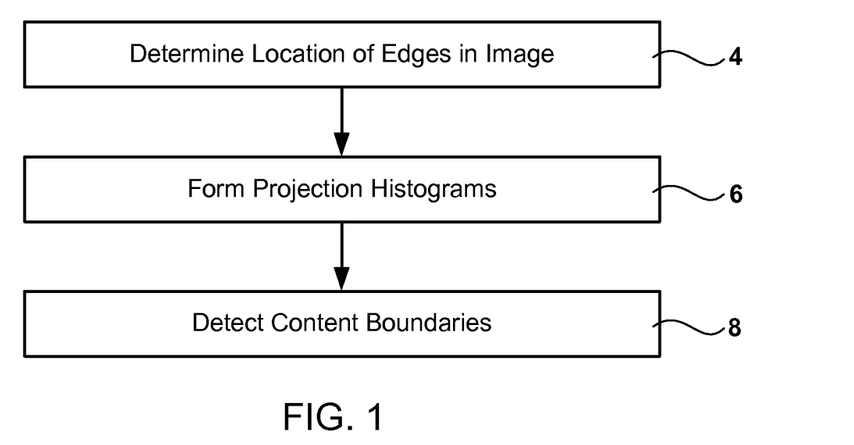
FIG. 1 is a chart showing exemplary embodiments of the present invention comprising extracting edges from an image, forming projection histograms from the edge maps and determining content boundaries from the projection histograms.

Some embodiments of the present invention described in relation to FIG. 1 comprise methods and systems for automatically determining the content boundaries in a digital page. In these embodiments, the location of the edges in the digital page may be extracted 4, also considered detected or determined, thereby producing an edge mask, or other representation, indicating locations of large gradient magnitude in the digital page. The edge mask may be projected on a skew vector and the skew vector normal vector to form 6 two projection histograms. The content boundaries may be detected 8, also considered determined, from the two projection histograms.

In some embodiments of the present invention described in relation to FIG. 1, edge-location determination 4 may comprise computing a gradient magnitude at each pixel in the digital page and thresholding the gradient magnitude results to form an edge mask. In some embodiments of the present invention, the gradient field in the x-direction, which may be denoted $G_x$, and the gradient field in the y-direction, which may be denoted $G_y$, may be determined independently, and the gradient magnitude, which may be denoted G, may be determined according to:

$$G = \|\nabla\|_1 = |G_x| + |G_y|,$$

where |•| denotes absolute value.

In some embodiments of the present invention, the digital page, which may be denoted I, may be independently convolved with two edge kernels to determine the gradient fields in the x-direction and the y-direction. In some embodiments the edge kernels may comprise Sobel operators, and the gradient fields may be determined according to:

$$G_x = \begin{bmatrix} 1 & 0 & -1 \\ 2 & 0 & -2 \\ 1 & 0 & -1 \end{bmatrix} * I \text{ and } G_y = \begin{bmatrix} 1 & 2 & 1 \\ 0 & 0 & 0 \\ -1 & -2 & -1 \end{bmatrix} * I.$$

In alternative embodiments, edge detection may comprise other edge operators and methods known in the art, for example, a Canny edge detector, a Prewitt edge detector, a Roberts Cross kernel and a Hough transform.

In some embodiments of the present invention, the gradient magnitude, G, may be thresholded to form a binary image, also considered edge map, which may be denoted G'. In these embodiments, the binary image, G', may be set equal to one of the binary values when a first condition is satisfied and may be set to the other of the binary values when the first condition is not satisfied. In some embodiments of the present invention, the binary image, G', may be determined according to:

$$G'(i, j) = \begin{cases} 1, & G(i, j) > \theta \\ 0, & G(i, j) \leq \theta \end{cases},$$

where θ denotes an adaptive threshold based on the content of the image and (i, j) denotes a location in the gradient-magnitude image, G.

In some embodiments of the present invention, the adaptive threshold, θ, may be determined according to:

$$\theta = -\mu \log\left(\frac{100-p}{100}\right),$$

where:

$$\mu = \frac{1}{w \cdot h} \sum_{x,y} G(x, y)$$

in which w is the width of and h is the height of the gradient-magnitude image, G, respectively, and p is a parameter which may control the rejection of the weakest p percentage of edges. In some embodiments, the value of p may be set to 95. In alternative embodiments, p may be set in the range of 93 to 97.

Figure 2:
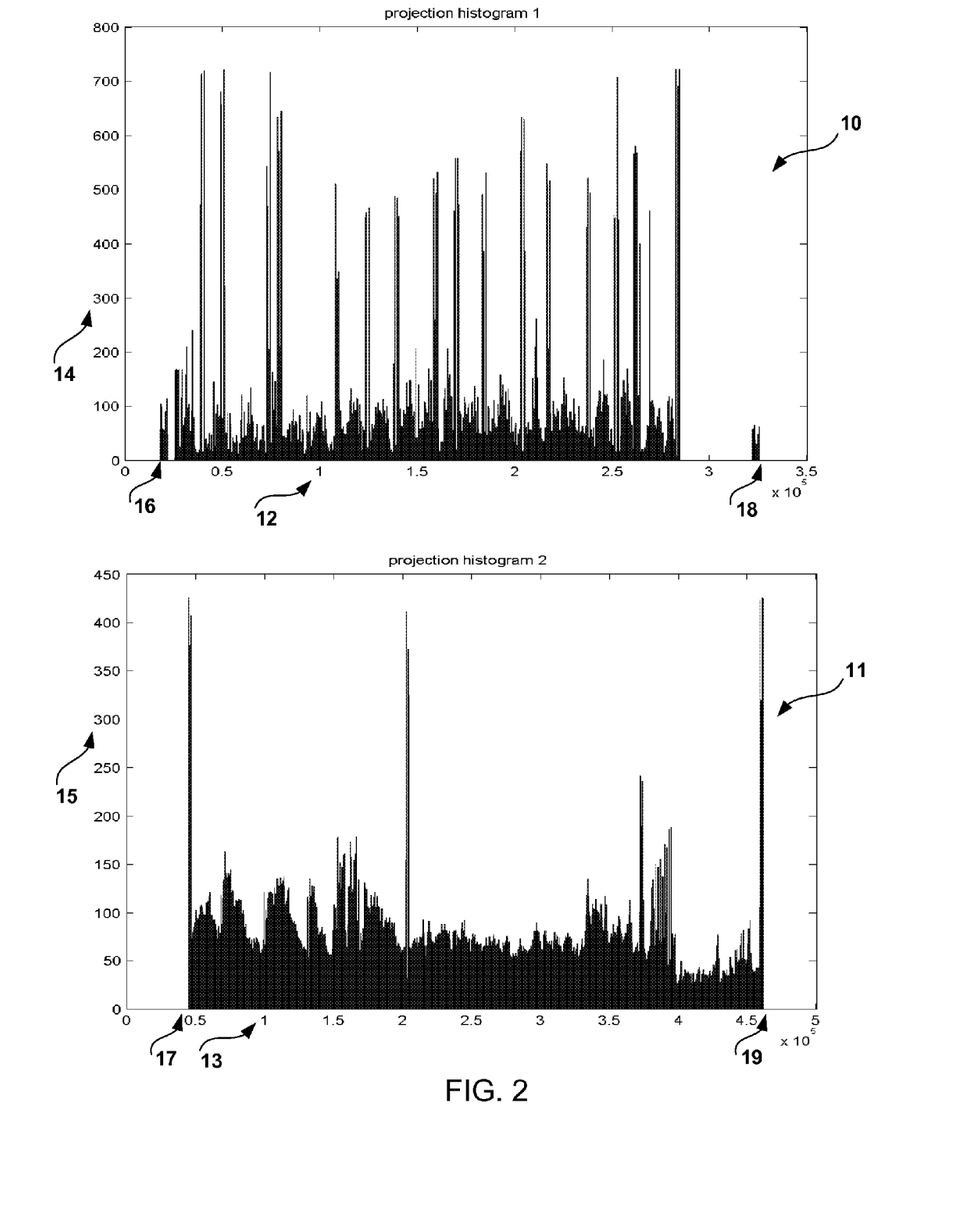
FIG. 2 is a picture depicting exemplary projection histograms.

Two projection histograms may be formed 6 by projecting the edge map, G', onto a skew vector and a vector normal to the skew vector. Two exemplary projection histograms 10, 11 are shown in FIG. 2. The horizontal axis 12, 13 of each histogram 10, 11 indicates a coordinate in the direction of the axis, and the vertical axis 14, 15 of each histogram 10, 11 indicates a pixel count. The content boundaries in the directions of the skew vector and the skew vector normal may be determined 8 by the first and last histogram bins which contain pixel counts. For the exemplary histograms 10, 11 shown in FIG. 2 these bins are indicated 16, 17, 18, 19.

Figure 3:
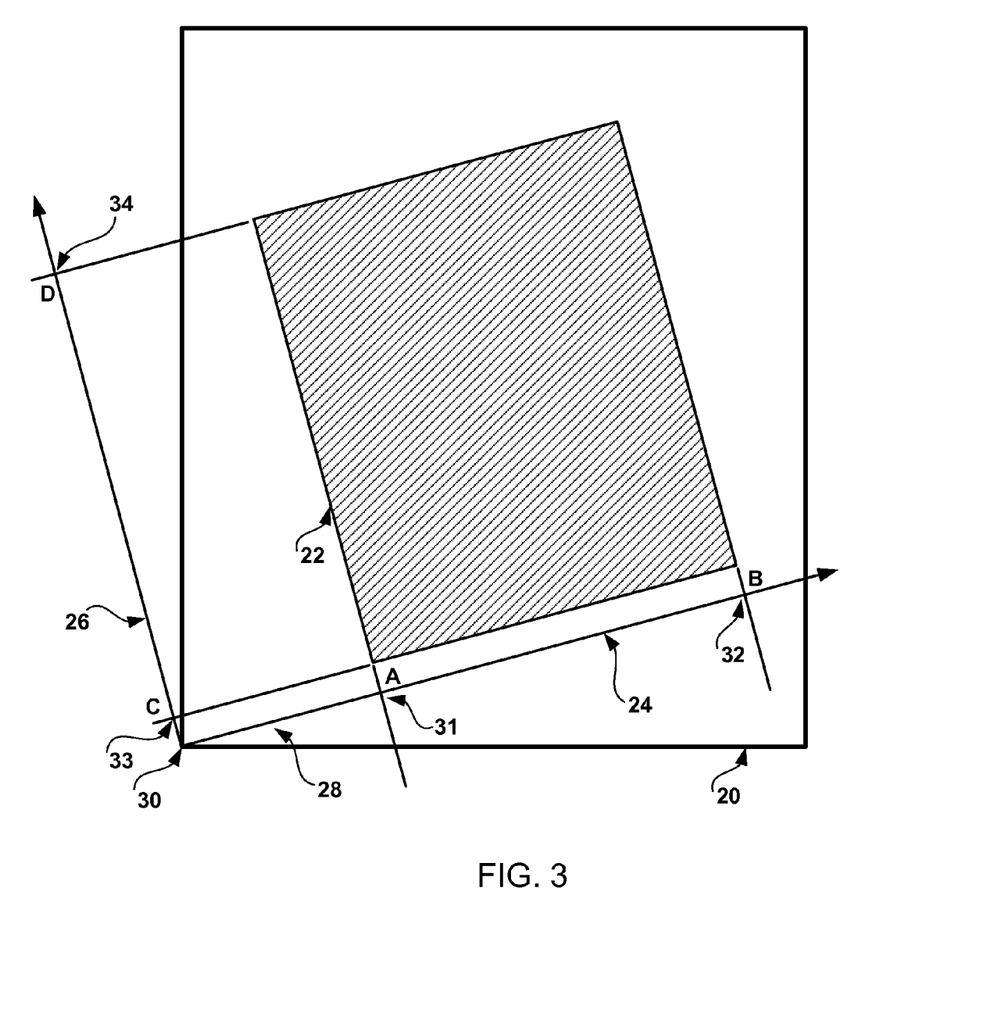
FIG. 3 is a picture depicting skewed image content.

Embodiments of the present invention may be further understood in relation to FIG. 3. FIG. 3 shows an exemplary image 20 comprising a page region 22 which is skewed relative to the image axes. The skew vector 24 and the normal to the skew vector 26 are shown for an exemplary skew angle 28. The skew vector 24 and the normal to the skew vector 26 are shown relative to an origin 30 which may be the same origin of the image coordinate system. The locations of the first and last histogram bins which contain pixel counts in the projection histogram associated with the skew vector 26 are labeled A 31 and B 32. The locations of the first and last histogram bins which contain pixel counts in the projection histogram associated with the normal to the skew vector 26 are labeled C 33 and D 34. In relation to the exemplary histograms 10, 11 shown in FIG. 2, assuming that the top histogram 10 corresponds to the projection histogram associated with the skew vector 24 and the bottom histogram 11 corresponds to the projection histogram associated with the normal to the skew vector 26, then A 31 may correspond to the location in the top histogram 10 of the first bin 16 from the origin which has a non-zero pixel count. B 32 may correspond to the location in the top histogram 10 of the last bin 18 from the origin which has a non-zero pixel count. C 33 may correspond to the location in the bottom histogram 11 of the first bin 17 from the origin which has a non-zero pixel count. D 34 may correspond to the location in the bottom histogram 11 of the last bin 19 from the origin which has a non-zero pixel count.

In some embodiments of the present invention, the content boundaries may be described by the corners of a bounding rectangle. These corners may be denoted in relation to the locations determined from the projection histograms. Denoting the location of the first and last histogram bins with non-zero count in the projection histogram associated with the skew vector as left and right, respectively, and the location of the first and last histogram bins with non-zero count in the projection histogram associated with the skew vector normal as bottom and top, respectively, then the corners of the bounding rectangle may be given according to:

bottom-left corner is (left, bottom) in the skewed coordinate system, bottom-right corner is (right, bottom) in the skewed coordinate system, top-left corner is (left, top) in the skewed coordinate system and top-right corner is (right, top) in the skewed coordinate system.

Figure 4:
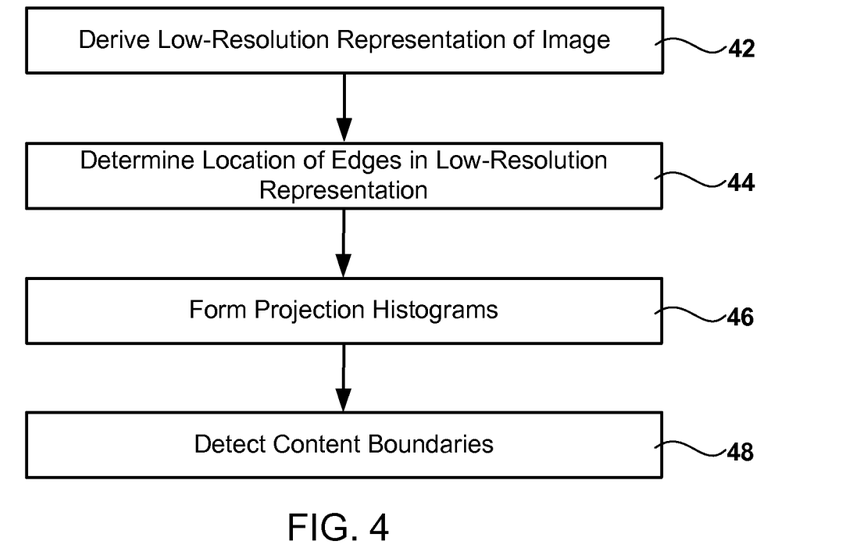
FIG. 4 is a chart showing exemplary embodiments of the present invention comprising forming a low-resolution representation of an input image prior to determining content boundaries.

Some embodiments of the present invention may be described in relation to FIG. 4. In these embodiments, a low-resolution representation of an image may be derived 42 prior to determining 44 edge locations in the low-resolution representation. Projection histograms may be formed 46 from the edge map, and the content boundaries may be detected 48 using the projection histograms. In some embodiments of the present invention, the low-resolution representation may be derived 42 through sub-sampling and down-sampling techniques known in the art. In some embodiments of the present invention, the low-resolution representation of the input image may be a 75 dots-per-inch image.

Figure 5:
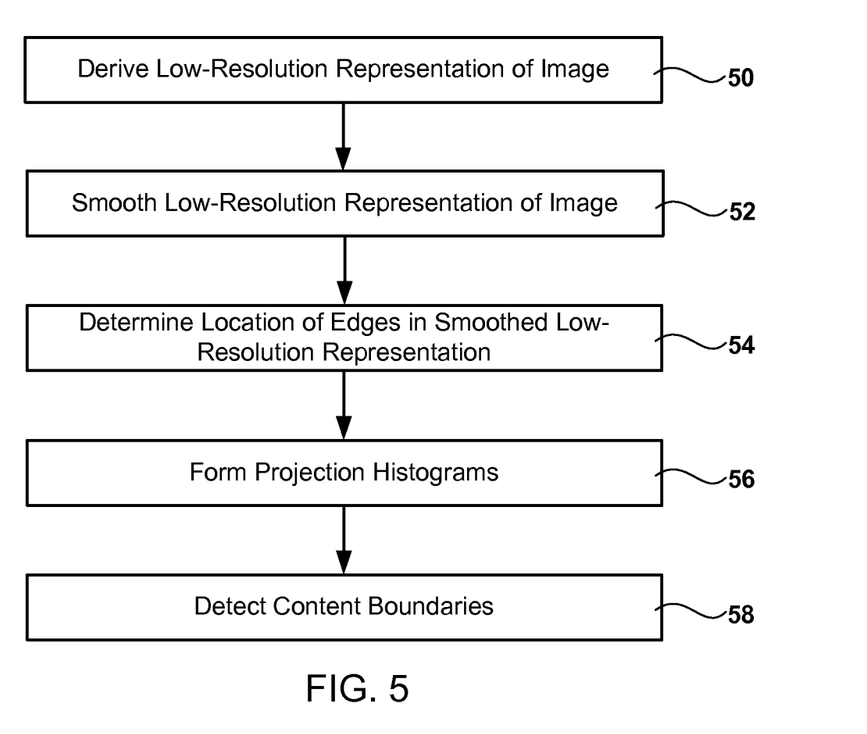
FIG. 5 is a chart showing exemplary embodiments of the present invention comprising smoothing a low-resolution representation of an input image prior to determining content boundaries.

Some embodiments of the present invention may be described in relation to FIG. 5. In these embodiments, a low-resolution representation of an image may be derived 50, and the low-resolution representation of the image may be smoothed 52 prior to determining 54 edge locations in the low-resolution representation. Projection histograms may be formed 56 from the edge map, and the content boundaries may be detected 58 using the projection histograms. In some embodiments of the present invention, the smoothed version of the low-resolution representation may be derived 52 by smoothing the low-resolution representation of the input image using a 3×3 Gaussian filter. In alternative embodiments, smoothing may comprise Gaussian filters of other size, smoothing filters of other types and other smoothing techniques known in the art.

Figure 6:
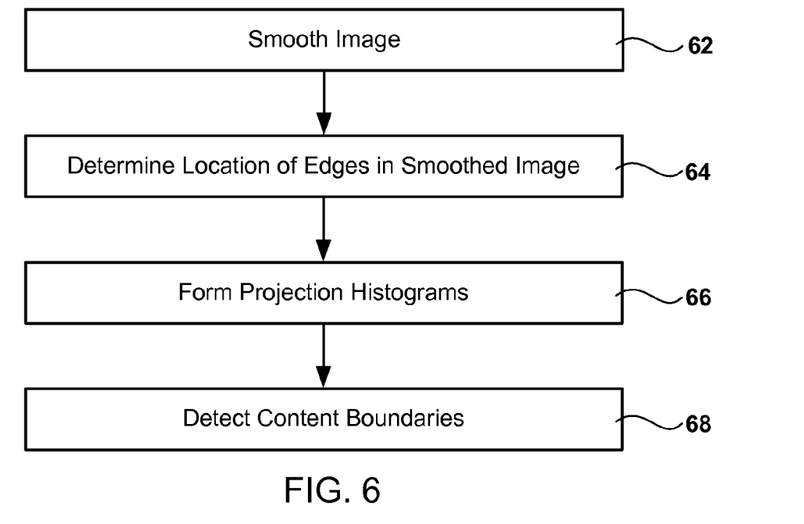
FIG. 6 is a chart showing exemplary embodiments of the present invention comprising smoothing an input image prior to determining content boundaries.

Some embodiments of the present invention may be described in relation to FIG. 6. In these embodiments, an input image may be smoothed 62 prior to determining 64 edge locations in the smoothed image. Projection histograms may be formed 66 from the edge map, and the content boundaries may be detected 68 using the projection histograms. In some embodiments of the present invention, the smoothed version of the input image may be derived 62 by smoothing the input image using a 3×3 Gaussian filter. In alternative embodiments, smoothing may comprise Gaussian filters of other size, smoothing filters of other types and other smoothing techniques known in the art.

Figure 7:
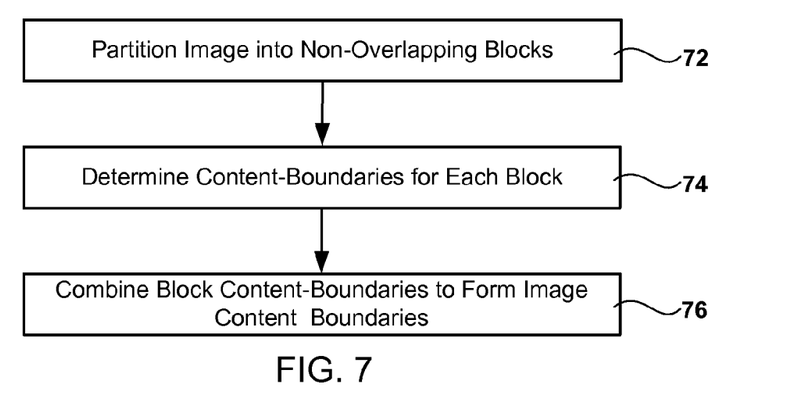
FIG. 7 is a chart showing exemplary embodiments of the present invention comprising partitioning an image into non-overlapping blocks and determining block content boundaries.

In some embodiments of the present invention described in relation to FIG. 7, an image may be partitioned 72 into non-overlapping blocks. The block content boundaries may be determined 74 according to embodiments of the present invention described above. The block boundaries may be combined 76 to generate the content boundary for the image. In some of these embodiments, the corners of the content boundaries for each block may be determined 74 and designated $R_i=[\text{top}_i \text{ bottom}_i \text{ left}_i \text{ right}_i]$. The content boundaries, which may be designated by the bounding rectangle corners and denoted R, for the image may be determined 76 from the block boundaries according to:

$$R=[\max(\text{top}_i) \; \min(\text{bottom}_i) \; \min(\text{left}_i) \; \max(\text{right}_i)]$$

for a coordinate origin in the lower-left of an image, and according to:

$$R=[\min(\text{top}_i) \; \max(\text{bottom}_i) \; \min(\text{left}_i) \; \max(\text{right}_i)]$$

for a coordinate origin in the upper-left of an image. In some embodiments of the present invention, determination 74 of the block content boundaries may be performed in parallel by a plurality of processors. In alternative embodiments, the determination 74 of the block content boundaries may be performed serially.

Figure 8:
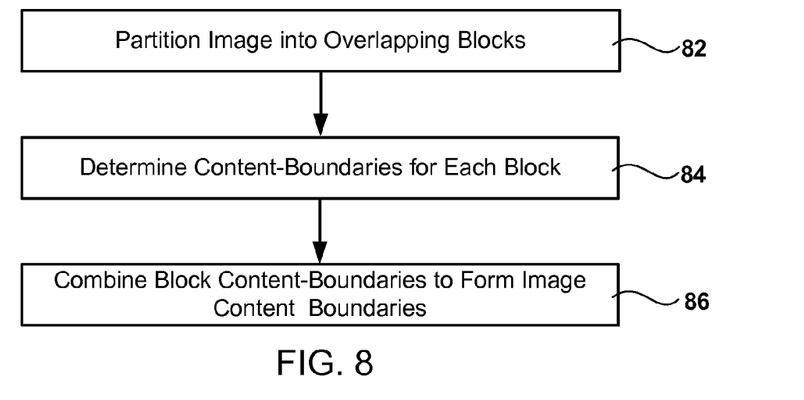
FIG. 8 is a chart showing exemplary embodiments of the present invention comprising partitioning an image into overlapping blocks and determining block content boundaries.

In some embodiments of the present invention described in relation to FIG. 8, an image may be partitioned 82 into overlapping blocks. The block content boundaries may be determined 84 according to embodiments of the present invention described above. The block boundaries may be combined 86 to generate the content boundary for the image. In some of these embodiments, the corners of the content boundaries for each block may be determined 84 and designated $R_i=[\text{top}_i \text{ bottom}_i \text{ left}_i \text{ right}_i]$. The content boundaries, which may be designated by the bounding rectangle corners and denoted R, for the image may be determined 86 from the block boundaries according to:

$$R=[\max(\text{top}_i) \; \min(\text{bottom}_i) \; \min(\text{left}_i) \; \max(\text{right}_i)]$$

for a coordinate origin in the lower-left of an image, and according to:

$$R=[\min(\text{top}_i) \; \max(\text{bottom}_i) \; \min(\text{left}_i) \; \max(\text{right}_i)]$$

for a coordinate origin in the upper-left of an image. In some embodiments of the present invention, determination 84 of the block content boundaries may be performed in parallel by a plurality of processors. In alternative embodiments, the determination 84 of the block content boundaries may be performed serially.

In some embodiments of the present invention, the input image may be a color image. In alternative embodiments of the present invention, the input image may be a gray-scale image. In still alternative embodiments of the present invention, the input image may be a binary image.

In some embodiments of the present invention, the input image may be a luminance image corresponding to a color image. In alternative embodiments of the present invention, the input image may be a binary image corresponding to a color image. In still alternative embodiments of the present invention, the input image may be a binary image corresponding to a gray-scale image.

In some embodiments of the present invention, an image may be cropped according to the determined content boundaries.

In some embodiments of the present invention, an image may be simultaneously cropped according to the determined content boundaries and skew corrected.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for content-boundary detection in a digital image, said method comprising:
    determining the location of edges in a first image related to a digital image, thereby producing an edge map;
    receiving a skew parameter;
    determining a skew vector associated with said skew parameter;
    forming a first projection histogram of said edge map in a first projection direction, wherein said first projection direction is related to said skew vector;
    forming a second projection histogram of said edge map in a second projection direction, wherein said second projection direction is normal to said first projection direction; and
    determining a content boundary associated with said digital image using said first projection histogram and said second projection histogram.

2. The method as described in claim 1 further comprising:
    projecting said edge map onto said skew vector; and
    projecting said edge map onto a vector normal to said skew vector.

3. The method as described in claim 1, wherein said first image is a low-resolution representation of said digital image.

4. The method as described in claim 1, wherein said first image is a smoothed version of said digital image.

5. The method as described in claim 4, wherein said smoothed version of said digital image is formed by convolving said digital image with a Gaussian filter.

6. The method as described in claim 1, wherein said first image is a smoothed version of a low-resolution representation of said digital image.

7. The method as described in claim 1 further comprising clipping said digital image according to said content boundary.

8. The method as described in claim 1, wherein said determining the location of edges comprises:
   determining a first gradient field of said first image in a first direction;
   determining a second gradient field of said first image in a second direction;
   computing a gradient magnitude from said first gradient field and said second gradient field; and
   thresholding said gradient magnitude.

9. The method as described in claim 8, wherein:
   said determining a first gradient field comprising convolving said first image with a first edge kernel; and
   said determining a second gradient field comprises convolving said first image with a second edge kernel.

10. The method as described in claim 8, wherein said thresholding comprises a threshold based on the mean of said gradient magnitude and an adjustable rejection parameter associated with edge strength.

11. The method as described in claim 1, wherein said determining a content boundary associated with said digital image using said first projection histogram and said second projection histogram comprises:
   determining a first coordinate in a first coordinate direction, wherein said first coordinate is associated with the first histogram bin having a non-zero count in said first projection histogram;
   determining a second coordinate in said first coordinate direction, wherein said second coordinate is associated with the last histogram bin having a non-zero count in said first projection histogram;
   determining a third coordinate in a second coordinate direction, wherein said third coordinate is associated with the first histogram bin having a non-zero count in said second projection histogram;
   determining a fourth coordinate in said second coordinate direction, wherein said fourth coordinate is associated with the last histogram bin having a non-zero count in said second projection histogram; and
   wherein said content boundary is a bounding rectangle described by the four vertices given by:
      said first coordinate and said third coordinate;
      said first coordinate and said fourth coordinate;
      said second coordinate and said third coordinate; and
      said second coordinate and said fourth coordinate.

12. A method for content-boundary detection in a digital image, said method comprising:
   partitioning a first image into a plurality of image tiles, said plurality of image tiles comprising a first tile and a second tile;
   receiving a skew parameter;
   determining a skew vector associated with said skew parameter;
   determining the location of edges in said first tile, thereby producing a first edge map;
   forming a first first-tile projection histogram of said first edge map in a first projection direction, wherein said first projection direction is related to said skew vector;
   forming a second first-tile projection histogram of said first edge map in a second projection direction, wherein said second projection direction is normal to said first projection direction;
   determining a first-tile content boundary associated with said first tile using said first first-tile projection histogram and said second first-tile projection histogram;
   determining the location of edges in said second tile, thereby producing a second edge map;
   forming a first second-tile projection histogram of said second edge map in said first projection direction;
   forming a second second-tile projection histogram of said second edge map in said second projection direction;
   determining a second-tile content boundary associated with said second tile using said first second-tile projection histogram and said second second-tile projection histogram; and
   determining an image-content boundary using said first-tile content boundary and said second-tile content boundary.

13. The method as described in claim 12 further comprising:
   projecting said first edge map onto said skew vector; and
   projecting said second edge map onto said skew vector.

14. The method as described in claim 12, wherein said first image tile and said second image tile are non-overlapping.

15. The method as described in claim 12, wherein said first image tile and said second image tile are overlapping.

16. The method as described in claim 12, wherein said first image is a low-resolution representation of a digital image.

17. The method as described in claim 12, wherein said first image is a smoothed version of said digital image.

18. The method as described in claim 12, wherein said first image is a smoothed version of a low-resolution representation of said digital image.

19. The method as described in claim 12 further comprising clipping said digital image according to said image-content boundary.

20. The method as described in claim 12, wherein said determining the location of edges in said first tile comprises:
   determining a first gradient field of said first tile in a first direction;
   determining a second gradient field of said first tile in a second direction;
   computing a gradient magnitude from said first gradient field and said second gradient field; and
   thresholding said gradient magnitude.

21. The method as described in claim 20, wherein:
   said determining a first gradient field comprising convolving said first tile with a first edge kernel; and
   said determining a second gradient field comprises convolving said first tile with a second edge kernel.

22. The method as described in claim 20, wherein said thresholding comprises a threshold based on the mean of said gradient magnitude and an adjustable rejection parameter associated with edge strength.

23. The method as described in claim 12, wherein said determining a first-tile content boundary using said first first-tile projection histogram and said second first-tile projection histogram comprises:

determining a first coordinate in a first coordinate direction, wherein said first coordinate is associated with the first histogram bin having a non-zero count in said first first-tile projection histogram;

determining a second coordinate in said first coordinate direction, wherein said second coordinate is associated with the last histogram bin having a non-zero count in said first first-tile projection histogram;

determining a third coordinate in a second coordinate direction, wherein said third coordinate is associated with the first histogram bin having a non-zero count in said second first-tile projection histogram; and determining a fourth coordinate in said second coordinate direction, wherein said fourth coordinate is associated with the last histogram bin having a non-zero count in said second first-tile projection histogram.

24. The method as described in claim 12, wherein said determining an image-content boundary using said first-tile content boundary and said second-tile content boundary comprises:

comparing a first-tile first coordinate in a first coordinate direction, wherein said first-tile first coordinate is associated with the first histogram bin having a non-zero count in said first first-tile projection histogram, and a second-tile first coordinate in said first coordinate direction, wherein said second-tile first coordinate is associated with the first histogram bin having a non-zero count in said first second-tile projection histogram;

comparing a first-tile second coordinate in said first coordinate direction, wherein said first-tile second coordinate is associated with the last histogram bin having a non-zero count in said first first-tile projection histogram, and a second-tile second coordinate in said first coordinate direction, wherein said second-tile second coordinate is associated with the last histogram bin having a non-zero count in said first second-tile projection histogram;

comparing a first-tile third coordinate in a second coordinate direction, wherein said first-tile third coordinate is associated with the first histogram bin having a non-zero count in said second first-tile projection histogram, and a second-tile third coordinate in said second coordinate direction, wherein said second-tile third coordinate is associated with the first histogram bin having a non-zero count in said second second-tile projection histogram; and comparing a first-tile fourth coordinate in said second coordinate direction, wherein said first-tile fourth coordinate is associated with the last histogram bin having a non-zero count in said second first-tile projection histogram, and a second-tile fourth coordinate in said second coordinate direction, wherein said second-tile fourth coordinate is associated with the last histogram bin having a non-zero count in said second second-tile projection histogram.

25. A system, encoded on a non-transitory computer-readable medium, for content-boundary detection in a digital image, said system comprising:

an edge extractor for determining the location of edges in a first image related to a digital image, thereby producing an edge map;

a skew parameter receiver for receiving a skew parameter;

a skew vector determiner for determining a skew vector associated with said skew parameter;

a first projection histogram generator for forming a first projection histogram of said edge map in a first projection direction, wherein said first projection direction is related to said skew parameter;

a second projection histogram generator for forming a second projection histogram of said edge map in a second projection direction, wherein said second projection direction is normal to said first projection direction; and a boundary determiner for determining a content boundary associated with said digital image using said first projection histogram and said second projection histogram.

26. The system as described in claim 25 further comprising:

a first edge-map projector for projecting said edge map onto said skew vector; and a second edge-map projector for projecting said edge map onto a vector normal to said skew vector.

* * * * *